Oct. 27, 1970 J. SZYDLOWSKI 3,535,873
GAS TURBINE COOLING DEVICES
Filed Oct. 23, 1968 3 Sheets-Sheet 2
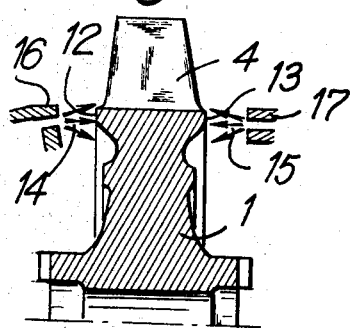
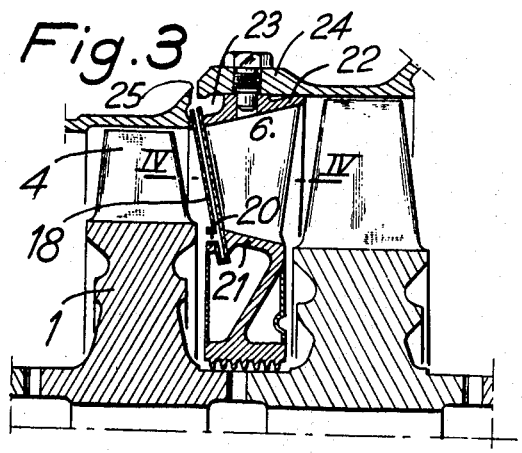
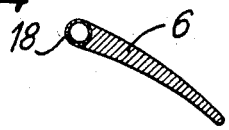
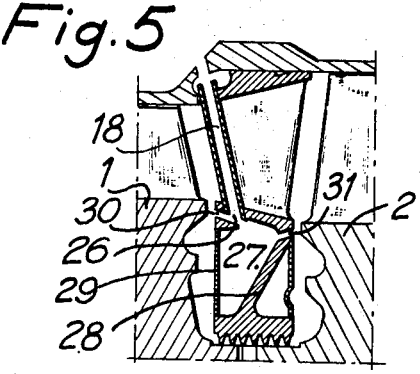
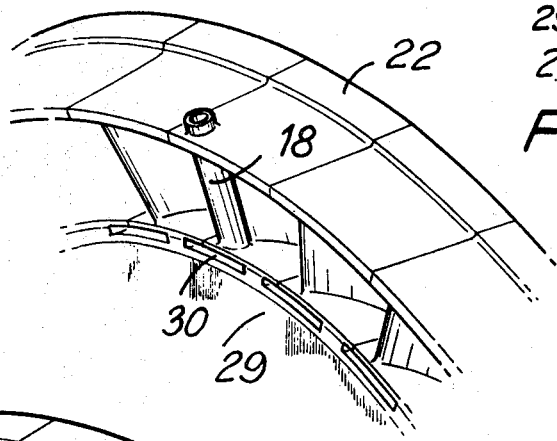
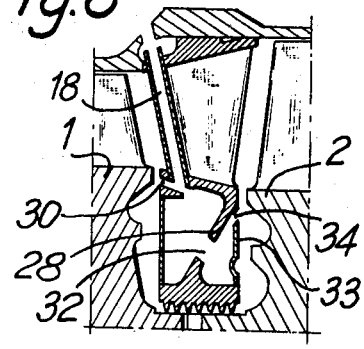
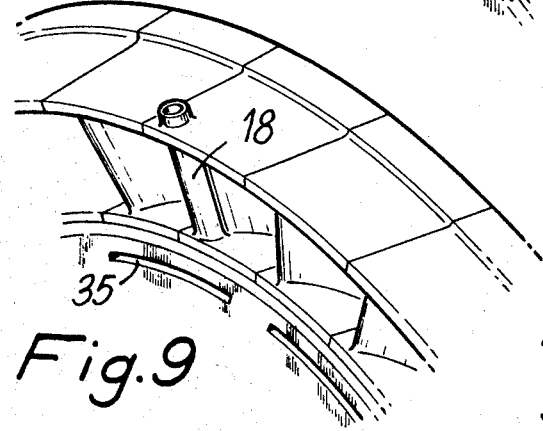
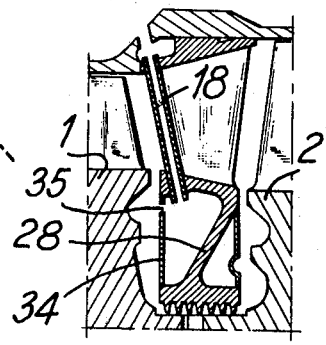

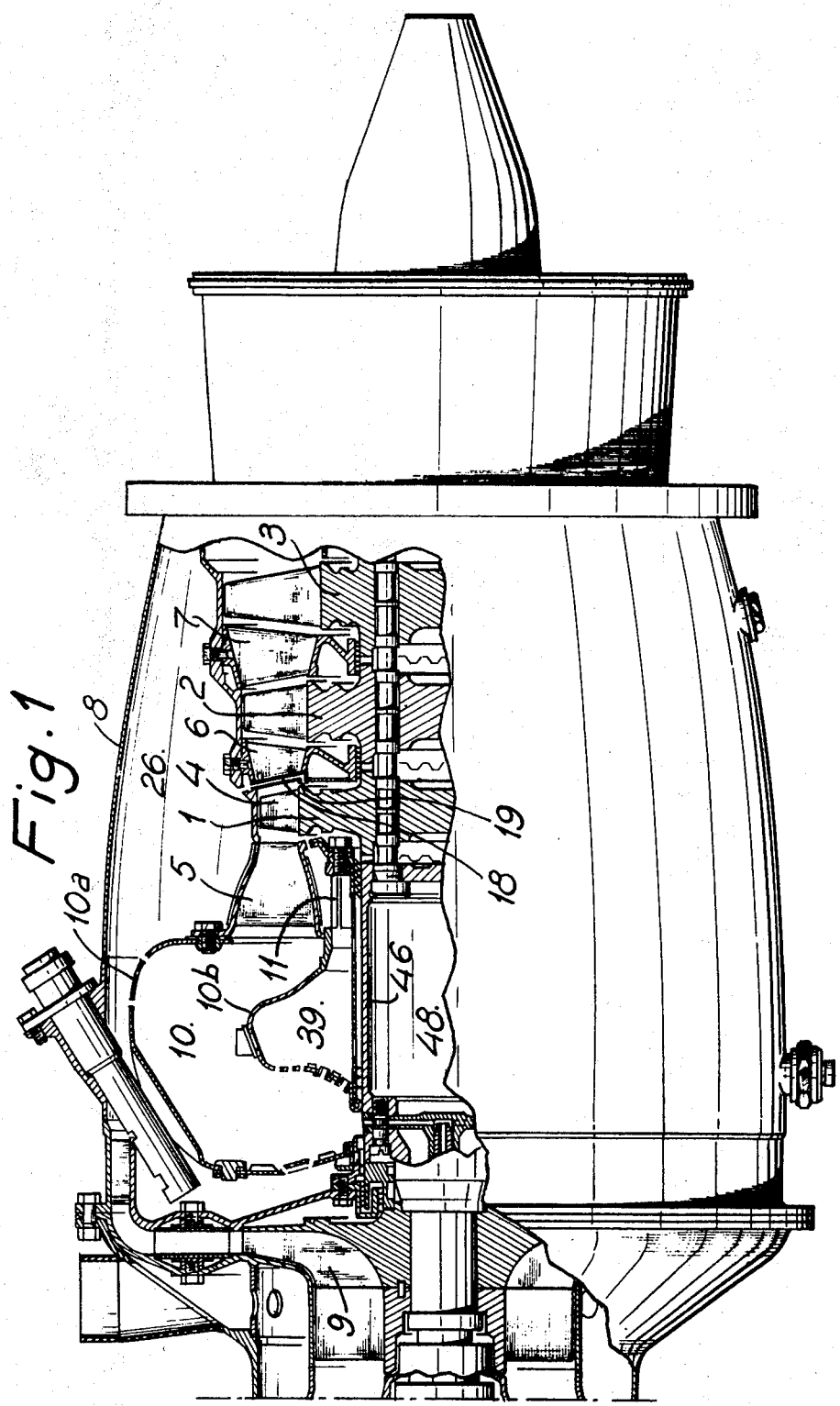

United States Patent Office 3,535,873
Patented Oct. 27, 1970

---

3,535,873
GAS TURBINE COOLING DEVICES
Joseph Szydlowski, Usine Turbomeca, Bordes, France
Filed Oct. 23, 1968, Ser. No. 770,002
Claims priority, application France, Oct. 24, 1967,
125,544
Int. Cl. F02c 7/12; F02g 1/00
U.S. Cl. 60—39.66                                     6 Claims

---

ABSTRACT OF THE DISCLOSURE

A device for cooling gas turbine rotating members, in which relatively cool air from a stationary part of the engine is blown over such a member, notably a turbine disc, the amount of air being dependent upon the degree of cooling required.

---

BRIEF SUMMARY OF THE INVENTION

In gas turbines, the turbine wheels, through which the combustion gases expand, are subjected to very high temperatures. The power liberated into the turbine is a function, among other parameters, of the temperature of the gases admitted into the turbine. All other things being equal, in a given turbine an increase in power can be obtained only by increasing the gas temperature.

Here two limiting factors arise: firstly, the thermal stresses, created chiefly in the turbine discs; secondly, the characteristics of the metals used for the fabrication of the discs.

With a given material, therefore, it is desirable to cool the turbine discs principally if it is desired to raise the temperature ahead of the turbine, so as to increase the turbine's power and efficiency, or else in order to improve its reliability and lengthen its life for operation at a given temperature.

It is one object of the present invention to achieve this by providing a device for cooling the wheels of gas turbines of the annular combustion chamber and rotary fuel injection type by blowing relatively cool air from a stationary part of the engine over at least one such wheel and notably a wheel disc, the quantity of air being dependent on the degree of cooling required.

According to another object of this invention, the cooling air can be bled from and channelled by peripheral portions of the engine and directed against a turbine wheel disc, as close as possible to the blade roots thereof.

Obviously, however, the blowing process may affect both the roots and the tips of the blades, if desired.

The cooling air may be directed against the upstream face, the downstream face, or both faces of a wheel disc, or against the blade roots, the blade tips, or both at once.

In the case of the wheel rim, the blowing could also be directed radially and centripetally.

The cooling device according to this invention may be devised by drawing blowing air from an atmosphere situated either outside the turbine and stator-blade shroud, inside such shroud, or both outside and inside it.

The cooling air may in any event be bled from the air delivered by the compressor associated with the turbine, at any point along the path of the air, the sole requirement being that the pressure of the bleed air must be higher than that prevailing in the gas stream flowing through the turbine, at the point where the cooling air is used.

In engines of this kind, according to a preferred embodiment cooling air can be admitted from the space surrounding the turbine shroud, beneath the engine casing, by means of passages having inlet in the shroud and outlet at the air blowing points, such passages being preferably formed by appropriately shaped tubes provided at the tip end of guide-vanes.

The cooling air is conveyed into contact with the parts to be cooled by means of nozzles, holes, or continuous or non-continuous circularly shaped slots, the overall design being such that air jets impinge upon the disc surfaces to be cooled, as close as possible to the blade roots, or upon the disc rims, adjacent the blade tips, or upon both at once.

The fact that, in contrast with prior art methods, the present invention involves projecting cooling air from a stationary part on to a rotating part of the engine ensures through such tubes at the tip end of guide vanes a degree of uniformity of cooling that cannot be achieved with other known means.

The description which follows with reference to the accompanying non-limitative exemplary drawings will give a clear understanding of how the invention can be carried into practice.

BRIEF DESCRIPTION OF THE DRAWING

FIG. 1 shows with partial cutaway a conventionally designed gas turbine having an annular combustion chamber and rotary fuel injection, in which cooling of a wheel disc is provided.

FIG. 2 is a diagrammatic showing of cool-air projections on to the blade roots of a wheel disc.

FIG. 3 shows in section on an enlarged scale a first method of distributing cooling air.

FIG. 4 is a section taken through the line IV—IV of FIG. 3.

FIG. 5 shows an alternative embodiment for FIG. 3.

FIG. 6 shows yet another possible embodiment for FIG. 3.

FIG. 7 shows still another possible embodiment for FIG. 3.

FIG. 8 shows partially in perspective stator blading devised as shown in FIGS. 5 or 6.

FIG. 9 shows in perspective stator blading as depicted in FIG. 7.

DETAILED DESCRIPTION

Figure 10:
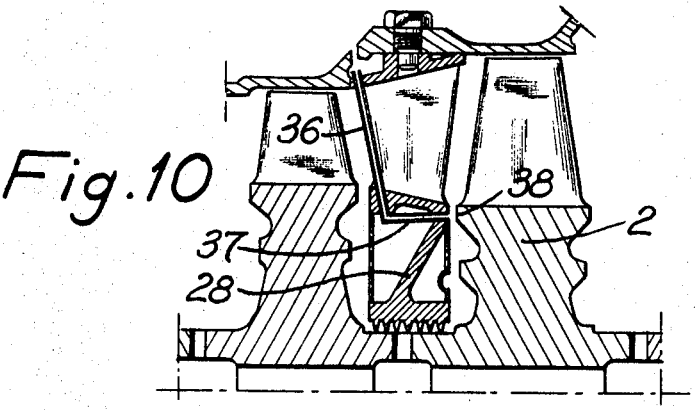
FIG. 10 shows another possible embodiment for FIG. 3.

In the embodiment shown in FIG. 1, the gas turbine engine comprises a three-stage turbine having three turbine discs 1, 2 and 3, upon the periphery of which are cut or affixed blades 4, and these bladed discs are part of the rotating members of said turbine the stationary parts of which are formed by stator blades 5, 6 and 7. This assembly is contained in turbine case 8 forming an envelope for the airstream issuing from a compressor 9. Nearly all this air enters an annular combustion chamber 10 through a plurality of holes and passages formed in the external wall 10a of said combustion chamber, and then through similar orifices in the associated internal wall 10b after it has passed through passages 11 embodied in the inner portions of the leading hollow guide-vanes 5, and in so doing has cooled the same.

In a conventional arrangement of this kind having rotary fuel injection, the temperature of discs 1, 2 and 3 stabilizes at values depending principally on the temperature of the gases issuing from chamber 10 ahead of the first guide-vanes 5. For the metal of the turbine wheels to preserve adequate mechanical characteristics, it is necessary for the temperature level attained to remain below values known beforehand that depend upon the nature of the metal.

In order to lower the temperature of the turbine discs it is necessary to project upon the annular surface 12 or 13 of disc 1, along the edge of blade roots 4 for example, jets of air such as those indicated by arrows 14 and 15, in predetermined adequate amounts dependent upon the degree of cooling required, this cool air being channelled through stationary portions of the engine such as the portions 16 and 17 shown in FIG. 2.

As illustrated in FIG. 1, such channelling can be accomplished by means of ducts 18 extending through stator blades 6 and opening through nozzles 19 upon the rear face of disc 1.

As is clearly shown in FIG. 3, some of the blades in stator blades 6 may be formed with a contoured leading edge consisting of a tube 18 (see FIGS. 3 and 4) open at its external end and closed at its internal end. A calibrated hole 20 (FIG. 3) formed through the thickness of the inner ring 21 of blades 6 allows the interior of tube 18 to have inlet on the front face of ring 21. Further, the open external ends of tubes 18 open above the outer ring 22 of stator blades 6, into a space 23 formed between said outer ring and the turbine shroud wall 24, and this wall is formed with holes 25 therein which cause space 23 to communicate with the space 26 included between outer case 8 and shroud 24. This arrangement allows part of the compressed air from compressor 9 to be channelled through tubes 18 up to the calibrated holes 20 and to be projected against the downstream face of turbine disc 1. Such air jets flow over the disc, immediately adjacent the roots of blades 4, and cool the latter. The cooling effect obtained depends upon the quantity of air discharged against the disc and hence upon the number and the cross-section of holes 20.

As is more clearly shown in FIG. 5, the tube 18 may have its interior space 26a opening into a front chamber 27 formed in the inner portion of the stator blades, between an inclined wall 28 and a sheet metal ring 29 leak-tightly affixed to the upstream face, the distribution orifices being formed by small nozzles 30 shaped as arcuate sectorial slots in the body of the metal in that region of the stator blades.

In the embodiment depicted in FIG. 5, the inclined wall 28 further embodies orifices or slots 31 opening opposite the blade roots of disc 2, whereby two turbine discs are cooled at once. The calibrated slots 30 and 31 can be formed by milling or otherwise.

In the constructional form shown in FIG. 6, the tube 18 is used to supply, in the same way as precedingly, front orifices or slots for cooling turbine disc 1, but in this case inclined wall 28 is formed with openings 32 which communicate with a rear space partly closed by a sheet metal ring 33, into the thickness of which are formed slots 34 for cooling disc 2.

In the embodiment of FIGS. 7 and 9, a tube 18 feeding air into a chamber formed between inclined wall 28 and a leaktightly affixed sheet-metal ring 34 (located forwardly in this embodiment) makes it possible to provide in said ring orifices 35 forming discontinuous arcuate sectorial slots or a continuous slot (not shown), without adversely affecting the strength of this engine component.

In the embodiment of FIG. 10, the communication means for cooling an upstream turbine disc face as previously provided by tube 18 are formed by a tube 36 embodying, within the stator blades, an angled portion 37 which extends through the wall 28 and opens on the downstream side of said stator blades, opposite the annular portion 38 of the blade roots of disc 2.

Figure 11:
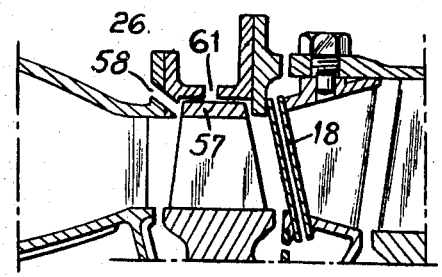
FIG. 11 shows yet another embodiment providing additional radial cooling of the disc rim and cooling of one of the disc faces from the external space.

As shown in FIG. 11, a rim 57 surrounding the blade tips could alternatively be cooled by radial orifices 61 located above the peripheral face of such rim, said orifices 61 being possibly associated with other orifices and notably upstream orifices 58 and downstream tubes 18 for cooling, as hereinbefore described, at least one of the disc faces, at the blade root location thereof, solely with air from the space 26.

In all cases the cooling air source must be such that the distribution pressure adjacent the discs is always higher than that prevailing, at the distribution points, in the fluid stream passing through the turbine and the stator blades, in order to ensure that this cooling air is entrained by the fluid stream without difficulty.

What I claim is:

1. In a gas turbine engine having at least one turbine wheel and stator-blades associated therewith, an annular combustion chamber and rotary fuel injection, an improvement comprising an engine case, a shroud enveloping at least one turbine wheel and the stator-blades associated therewith, said case and shroud bounding a space for bleeding cooling air therefrom, nozzles for blowing said air over said wheel, and passageway means between said space and said nozzles, and constituted by shaped radial ducts secured to said stator-blades at the leading edges thereof.

2. In an engine as claimed in claim 1, wherein said nozzles are formed by orifices.

3. In an engine as claimed in claim 1, wherein said nozzles are formed by arcuate sectorial slots.

4. In an engine as claimed in claim 1, wherein said nozzles are formed by circular slots.

5. In an engine as claimed in claim 1, said nozzles being positioned to face a turbine wheel and opposite the root portion of the blades carried by said wheel.

6. In a gas turbine engine as claimed in claim 1, said nozzles being situated on either side of said wheel.

References Cited

UNITED STATES PATENTS

| | | |
|---|---|---|
| 2,442,019 | 5/1948 | Ray. |
| 2,648,519 | 8/1953 | Campini _____ 253—39.15 |
| 2,919,891 | 1/1960 | Oliver _____ 253—39.15 XR |
| 2,922,278 | 1/1960 | Szydlowski _____ 253—39.15 XR |
| 3,034,298 | 5/1962 | White _____ 253—39.15 XR |
| 3,437,313 | 4/1969 | Moore. |

FOREIGN PATENTS 776,847    6/1957    Great Britain.

CARLTON R. CROYLE, Primary Examiner